E. H. GOLD.
HOSE COUPLING.
APPLICATION FILED FEB. 29, 1912.

1,081,444.

Patented Dec. 16, 1913.
3 SHEETS—SHEET 1.

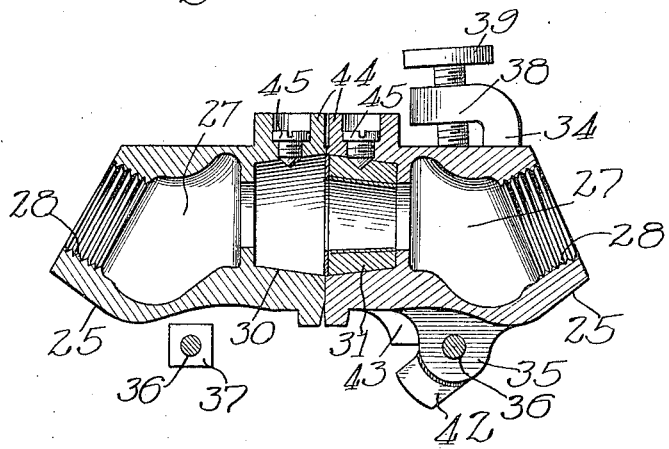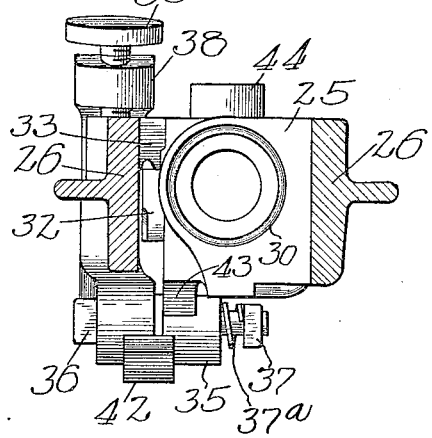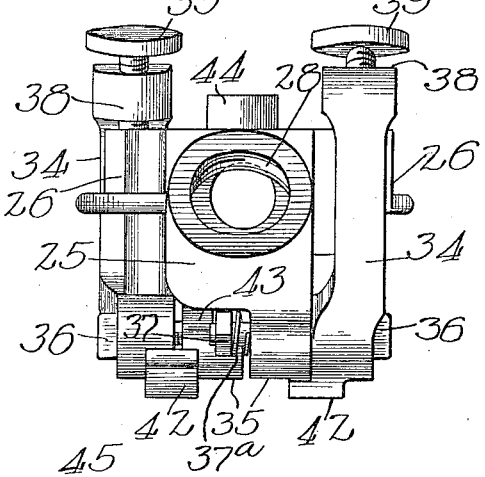

E. H. GOLD.
HOSE COUPLING.
APPLICATION FILED FEB. 29, 1912.
1,081,444.
Patented Dec. 16, 1913.
3 SHEETS—SHEET 3.
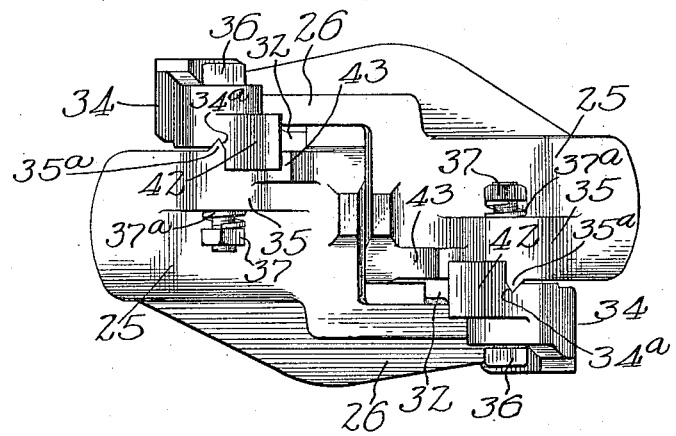
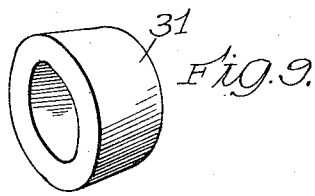
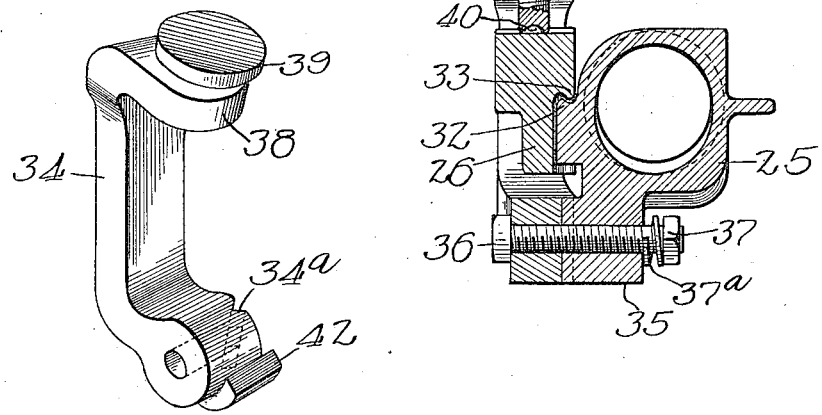
Witnesses:
G. H. Domarus Jr.
Hubert Hahn.
Inventor
Egbert H Gold
by J. R. Barnett
his attorney.

UNITED STATES PATENT OFFICE.

EGBERT H. GOLD, OF CHICAGO, ILLINOIS.

HOSE-COUPLING.

1,081,444.   Specification of Letters Patent.   Patented Dec. 16, 1913.

Application filed February 29, 1912. Serial No. 680,686.

*To all whom it may concern:*

Be it known that I, EGBERT H. GOLD, a citizen of the United States, residing at Chicago, in the county of Cook and State of Illinois, have invented certain new and useful Improvements in Hose-Couplings, of which the following is a specification.

My invention relates to hose couplings and more particularly to hose couplings, of the gravity type, which are used for coupling together the hose of steam train pipes on railway cars; and the invention has for its principal object to provide, in addition to the ordinary means for interlocking the mating coupler heads, a positive lock, which may be used or not as circumstances require, for preventing the coupler heads from being moved out of their interlocking relationship, either partly or wholly, under conditions which are well known to those skilled in this art. My invention provides a supplemental coupler lock for accomplishing this result which is simple and inexpensive to make, which will securely and positively lock the coupler members together when desired, and which is very easy to manipulate and little likely to get out of order or cause trouble to the trainmen. Furthermore, the construction is such that the locking member may stand out of locking engagement with the coupler head, or part thereof that it is designed to engage, without being in the way and without any danger of being accidentally moved back into the locking position. This is important as it is not always desirable to have the coupling positively locked.

A particular object of the invention is to provide a suitable lock for a hose coupling of the type described and claimed in my application Serial No. 631,252 filed June 5, 1911, in which the coupler heads are rigidly engaged and locked together without causing the gaskets to exert any substantial pressure one against the other, the heat of the steam being utilized to expand the gaskets so as to produce a steam tight joint between the coupler heads.

The invention has for further objects such other new and improved constructions, arrangements and devices in hose couplings as will be hereinafter described and claimed.

The invention is illustrated, in a preferred embodiment, in the accompanying drawings, wherein—

Figure 1:
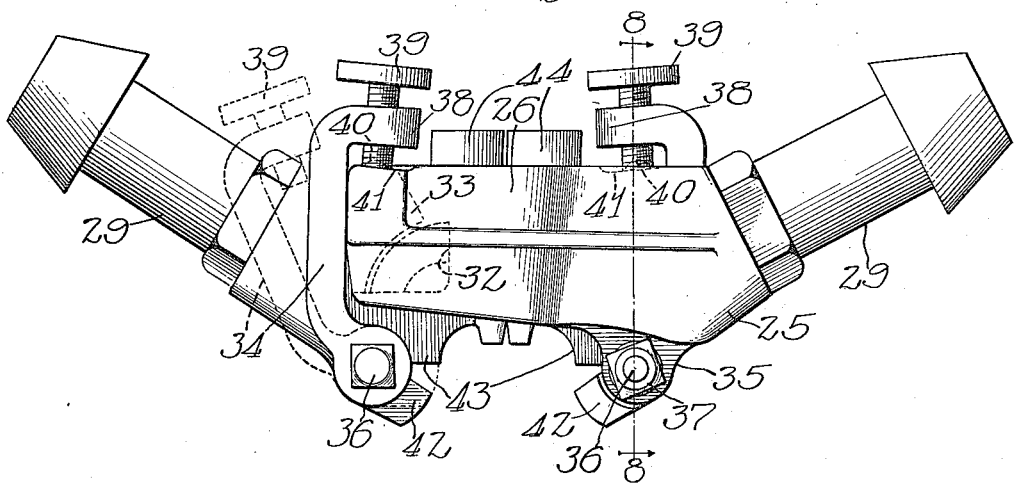
Figure 2:
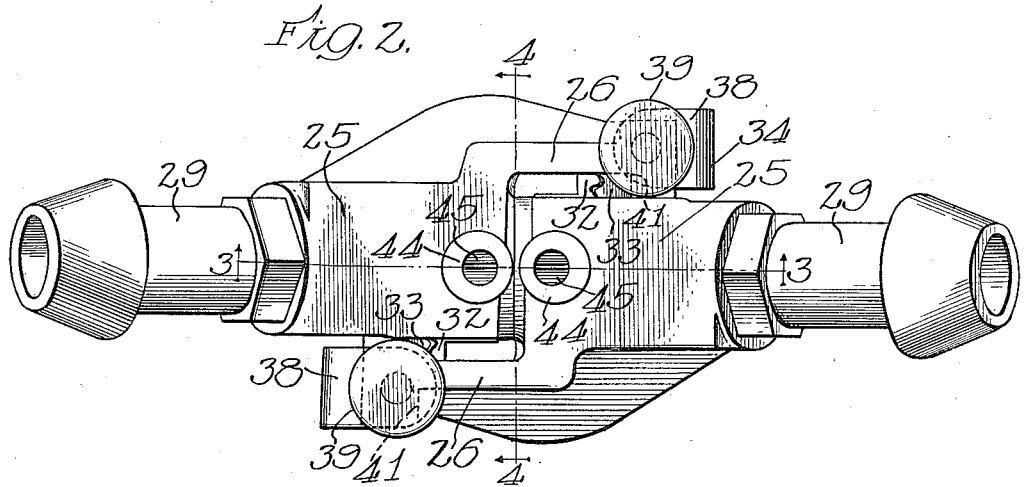

Figure 1 is a side elevation of a coupling constructed in accordance with my invention; Fig. 2, a plan view of the same; Fig. 3, a section taken on line 3—3 of Fig. 2, looking in the direction of the arrows, the hose nipples being omitted; Fig. 4, a section taken on line 4—4 of Fig. 2, looking in the direction of the arrows; Fig. 5, an end elevation, the nipple being omitted; Fig. 6, a detail, in perspective, of the gasket locking screw; Fig. 7, an inverted plan view of the parts shown in Fig. 3; Fig. 8, a sectional view taken on line 8—8 of Fig. 1, looking in the direction of the arrows; Fig. 9, a view, in perspective, of one of the gaskets, and Fig. 10, a similar view of one of the locking arms.

Like characters of reference designate like parts in the several figures of the drawings.

Referring to the drawings, the coupling is composed of two mating coupling members each, in the embodiment shown, consisting of a coupler head 25 formed with the rigid coupling arm 26 adapted to engage with the side of the other coupler head and with the steam port 27 terminating at one end in the threaded bore 28 adapted to receive the hose nipple 29 and at the other end in the gasket recess 30 adapted to receive a gasket 31 made of the usual rubber composition. The coupler heads and their arms are provided with the usual engaging lugs 32, 33 which may be of any preferred configuration and which serve, under normal conditions, to hold the mating coupler members in interlocked coupling relation.

One or preferably each of the coupler heads is provided with a supplemental, positive lock constructed as follows: 34 designates a locking arm pivoted at its lower end to the side of one of the coupler heads. The coupler head is preferably formed on its under side with a boss 35 and the arm 34 is pivoted on a bolt 36 which extends through the boss and is held in position by the nut 37. The arm 34 has an angular projection 38 which is adapted to extend around and over the end of the coupling arm 26 of the other coupling member. A screw 39, the end of which is preferably recessed as indicated at 40, is threaded through a projection 38 and bears against the upper surface of the coupling arm 26 just referred to. The upper surface of the coupling arm is preferably inclined downwardly away from the locking arm as indicated at 41. By screwing down screw 39 the mating coupling members may be tightly drawn and locked together. It will be understood that these coupling members in service have to be mated at different times with a large number of complementary coupling members which may differ slightly due to wear, or to injury, or defects in the castings. The screws 39 provide the necessary adjustability to meet this condition. The lower end of the locking arm 34 is formed with a lug 42 which is adapted to come into contact with a stop lug 43 on the under side of the coupler head when the arm has been moved back a little way from its locking position. The dotted lines in Fig. 1 show the arm in the disengaged position. The weight of the arm prevents it from being accidentally thrown or moved back into the locking position when it is not desired to have the coupler heads locked. If desired the arm may be removed entirely by removing the bolt 36. The coupler heads are each formed on top with a boss 44 adapted to receive a pointed screw 45, the point of which passes through a perforation in the coupler head and may be driven into the gasket 31 to hold the same in place. Preferably the locking arm 34 is formed at its pivot point with a V-shaped groove 34<sup>a</sup> and the boss 35 with a V-shaped lug 35<sup>a</sup>. A spring washer 37<sup>a</sup> is interposed between the nut 37 and the boss 35. By this arrangement the arm is kept from accidentally falling back out of the locking position if the screw 39 becomes loosened and also from being accidentally moved into the locking position when not intended to be used.

The supplemental lock above described, it will be seen, not only prevents actual uncoupling, but also prevents the coupler heads from being moved sufficiently to cause a gap at the meeting faces and the consequent leakage of steam.

While the device may be used on any "Sewall" or "gravity" coupler, it is intended particularly for use in a coupling of the sort shown in which the rigid faces of the mating coupler heads are brought into engagement and the gaskets afterward expanded by the heat of the steam sufficiently to make a steam tight joint. In a structure of this sort, the advantages of which are pointed out in my application for patent above referred to, it is important that where a supplemental lock is used, it should be capable of holding the coupler heads in rigid engagement, as the effectiveness of the coupling depends upon that rather than upon the compression of the gaskets. Moreover, the supplemental or positive lock herein shown may be quickly thrown open leaving the coupler heads coupled together but by the ordinary interlock of the arms with the heads which will automatically uncouple when the cars of the train separate.

I claim:

1. In a hose coupling, the combination with mating coupler heads each formed with a coupling arm adapted to engage with the side of the other coupler head, of a supplemental locking arm pivotally engaged at the lower end with one of the heads, so that it may stand either in an engaging or a disengaged position with respect to the coupling arm of the other head, and formed at its upper end with an angular projection adapted to extend over the end of said coupling arm of the other coupler head when the said locking arm is in engaging position, and a screw in said projection adapted to bear against the upper surface of said coupling arm.

2. In a hose coupling, the combination with mating coupler heads each formed with a coupling arm adapted to engage with the side of the other coupler head, of a locking arm pivotally engaged at the lower end with one of the heads, so that it may stand either in an engaging or a disengaged position with respect to the coupling arm of the other head, and formed at its upper end with an angular projection adapted to extend over the end of said coupling arm of the other coupler head when the said locking arm is in engaging position, a screw in said projection adapted to bear against the upper surface of said coupling arm, and a stop lug on the lower end of said locking arm adapted to come into contact with the head on which said arm is pivoted so as to hold said arm in an oblique, non-locking position.

3. In a hose coupling, the combination with a pair of mating coupler heads, each formed with a coupling arm adapted to interlock with the side of the complementary coupler head, of a supplemental locking arm pivotally engaged to one of said heads, so that it may stand either in an engaging or a disengaged position with respect to the coupling arm of the other head, and formed so as to extend over said coupling arm of the other head when the said locking arm is in engaging position, and an adjustable member connected with said pivoted arm and adapted to be brought to bear upon the coupling arm thereunder.

4. In a hose coupling, the combination with a pair of mating coupler heads, the opposed faces of which are adapted to be abutted one against the other, each of the heads being formed with a coupling arm adapted to interlock with the side of the complementary coupler head, of a supplemental locking arm pivotally engaged to one of said heads, so that it may stand either in an engaging or a disengaged position with respect to the coupling arm of the other head, and formed so as to extend over said coupling arm of the other head when the said locking arm is in engaging position, and an adjustable member connected with said pivoted arm and adapted to be brought to bear upon the coupling arm thereunder.

5. In a hose coupling, the combination with a pair of mating coupler heads each formed with a coupling arm adapted to interlock with the side of the complementary coupler head, of a supplemental locking arm pivoted to the side of one of said heads so as to swing in a direction longitudinally of the coupling and take a position over the end of the coupling arm of the complementary head, and an adjustable member connected with said pivoted arm adapted to be brought to bear upon the coupling arm thereunder.

6. In a hose coupling, the combination with a pair of mating coupler heads each formed with a coupling arm adapted to interlock with the side of the complementary coupler head of a supplemental locking arm pivoted to the side of one of said heads so as to swing in a direction longitudinally of the coupling and take a position over the end of the coupling arm of the complementary head, an adjustable member connected with said pivoted arm adapted to be brought to bear upon the coupling arm thereunder, the pivoted arm and the head to which it is pivoted being formed with coengaging wedge faces, and a spring adapted to be compressed when said arm is turned upon its pivot.

7. In a hose coupling, the combination with a pair of mating coupler heads, each formed with a coupling arm adapted to interlock with the side of the complementary coupler head of a supplemental locking arm provided with an angularly disposed projection, a screw extending through said projection, a bolt by means of which said arm is pivotally mounted on the side of one of said coupler heads, a pair of coengaging wedges on said locking arm and the side of the coupler head to which it is pivoted, a spiral spring on the end of said bolt, an abutment on the bolt for said spring, and stops on the locking arm and the coupler head, substantially as described.

8. In a hose coupling, the combination with a pair of mating coupler heads, each formed with a coupling arm adapted to interlock with the side of a complementary coupler head, of a supplemental locking arm pivotally engaged to one of said heads so that it may stand either in an engaging or a disengaged position with respect to the coupling arm of the other head and formed so as to extend over said coupling arm of the other head when said locking arm is in engaging position, an adjustable member connected with said pivotal arm and adapted to be brought to bear upon the coupling arm thereunder, and a spring arranged so that it tends to hold the locking arm in the disengaged position.

9. In a hose coupling, the combination with a pair of mating coupler heads, each formed with a coupling arm adapted to interlock with the side of a complementary coupler head, of a supplemental locking arm pivotally engaged to one of said heads so that it may stand either in an engaging or a disengaged position with respect to the coupling arm of the other head and formed so as to extend over said coupling arm of the other head when said locking arm is in engaging position, an adjustable member connected with said pivotal arm and adapted to be brought to bear upon the coupling arm thereunder, and means which serves to hold the locking arm against being accidentally displaced from its disengaged position.

10. In a hose coupling, the combination with a pair of mating coupler heads, each formed with a coupling arm adapted to interlock with the side of the complementary coupler head, a supplemental locking arm, a bolt which pivots said arm to one of said heads, said arm being formed so as to extend over the coupling arm of the other head when the said locking arm is in engaging position, an adjustable member connected with said pivoted arm and adapted to be brought to bear upon the coupler arm thereunder, and a spring on said bolt which tends to hold said locking arm in its engaging and in its disengaged position.

EGBERT H. GOLD.

Witnesses:
L. A. FALKENBERG,
G. Y. SKINNER.